United States Patent [19]

Medvedev et al.

[11] Patent Number: 5,589,050
[45] Date of Patent: Dec. 31, 1996

[54] ELECTRODIALYZER FOR DESALINATION

[75] Inventors: Igor N. Medvedev, Moscow; Klim A. Schogenov, Nalchik, both of Russian Federation

[73] Assignee: Aquamin Company Limited

[21] Appl. No.: 313,284

[22] PCT Filed: Mar. 31, 1993

[86] PCT No.: PCT/GB93/00675
§ 371 Date: Mar. 16, 1995
§ 102(e) Date: Mar. 16, 1995

[87] PCT Pub. No.: WO93/20012
PCT Pub. Date: Oct. 14, 1993

[30] Foreign Application Priority Data

Mar. 31, 1992 [GB] United Kingdom ............ 9207080

[51] Int. Cl.$^6$ .......................... B01D 61/44; C02F 1/469
[52] U.S. Cl. .................................. 204/630; 204/633
[58] Field of Search ........................ 204/301, 257, 204/283, 630, 633

[56] References Cited

U.S. PATENT DOCUMENTS

| 3,091,583 | 5/1963 | Schufle | 204/301 |
| 4,354,905 | 10/1982 | Yoshida et al. | 204/98 |
| 4,528,077 | 7/1985 | Fair et al. | 204/95 |

FOREIGN PATENT DOCUMENTS

| 1223965 | 6/1960 | France . | |
| 2624885 | 6/1989 | France . | |
| 750500 | 6/1956 | United Kingdom . | |
| 764067 | 12/1956 | United Kingdom . | |
| 882432 | 11/1961 | United Kingdom . | |
| 923145 | 4/1963 | United Kingdom . | |
| 1067567 | 5/1967 | United Kingdom . | |
| 9104782 | 4/1991 | WIPO | 204/182.5 |

*Primary Examiner*—Arun S. Phasge
*Attorney, Agent, or Firm*—Senniger, Powers, Leavitt & Roedel

[57] ABSTRACT

An electrodialyzer for desalinating an aqueous solution comprises a plurality of parallel chambers (5, 6, 7, 8) formed alternately of anion exchange membranes (3) and cation exchange membranes (2, 4) arranged in a non-linear flow path the aqueous solution so that the solution passes successively across a surface of each of the membranes. The two end chambers (5, 8) house an anode (9) and a cathode (18) connected to a source of electrical bias (11) and this causes ions to form and to migrate from the flow path into a concentration chamber (6) separated from the flow path by membranes (2, 3) from which the concentrated fluid can be drawn off. A process is also described for desalinating aqueous solutions.

5 Claims, 2 Drawing Sheets

ELECTRODIALYZER FOR DESALINATION

This application is a 371 of PCT/GB93/0067 filed Mar. 31, 1993 and published as WO93/20012 Oct. 14, 1993.

TECHNICAL FIELD

The present invention relates to an electrodialyzer. That is a unit for electrolyte separation using selective membranes under action of an electromotive force created in solution. In particular, this invention relates to multichamber apparatus for desalting electrolyte aqueous solutions with ion-exchange membranes, and to a process for desalination.

BACKGROUND ART

Apparatus for desalting electrolyte aqueous solutions is known and in particular there are electrodialyzers which comprise a number of chambers formed in the housing of the apparatus by partitions of selective ion-exchange membranes through which solutions of salts are moved. In the end chambers there are electrodes connected up to the direct electric current supply. Applied across the membranes, the electric current makes the chambers in turn enriched and poorer with electrolyte. This process results in separation of the initial solution of electrolyte into desalted and concentrated solutions.

As described in U.S. Pat. No. 4,525,259, an electrodialyzer comprises a line of concentrating chambers between which are situated chambers with diluted solution. This line of chambers has a cathodic chamber with a cathode at one end of it and an anodic chamber with an anode at another end.

In the chambers adjacent to the chambers which contain electrodes, the diluted solution is maintained to prevent migration of ions from concentrated solutions in the concentration chambers into the chambers with the electrodes in them.

All the chambers of this electrodialyzer have input and output pipe branches for corresponding aqueous solutions. Also, the apparatus has two tanks for catholyte and anolyte collection which are in communication with corresponding electrode chambers. These tanks may be isolated from the electrode chambers during the process of solution recirculation between the chambers.

Another common electrodialyzer (F. N. Meller, "Electrodialysis—Electrodialysis Reversal Technology", IONICS, Incorporated, March 1984, p. 53–56) comprises a housing inside of which are set alternately with cation- and anion-exchange membranes arranged parallel with each other to form a line of chambers; a anodic chamber with an anode set at one end wall and a cathodic chamber with a cathode at another end wall with at least one pair of concentration/desalting chambers between them. The anodic chamber is formed by the internal surface of the housing walls and by one side of the first cation-exchange membrane, the other side of which, together with the internal surface of the housing walls and one side of the anion-exchange membrane, forms a concentration chamber which is adjacent to the anodic chamber. Another side of the anion-exchange membrane together with the internal surface of the housing walls and the next cation-exchange membrane form a desalting chamber.

The rest of the pairs of concentration/desalting chambers are formed in the same way. The last cation-exchange membrane, one side of which limited the adjacent desalting chamber, forms the cathodic chamber by its other side and the internal surface of the housing wall.

Each chamber of this known electrodialyzer has an input pipe branch for initial aqueous solution. What is more, anodic and cathodic chambers have input pipe branches for anolyte and catholyte respectively, while each concentration and desalting chamber has output pipe branches for concentrated and desalted solutions.

This known electrodialyzer is equipped with a relay unit for electrode polarity reversal and with a device for redirecting hydraulic flows from the desalting and concentration chambers.

The following describes the normal operation of the known electrodialyzer.

An aqueous solution of electrolyte is fed simultaneously into all chambers through the respective pipe branches, then a direct electric current is supplied to the electrodes.

The process of electrolysis takes place in anodic and cathodic chambers and results in anolyte and catholyte formation respectively. Under the influence of the direct current the ions of the salts diffuse through ion-exchange membranes into the concentration chamber realizing the desalting of aqueous solution in the desalting chamber and concentrate formation in the concentration chamber. Then the desalted solution and the concentrate are withdrawn out of the chambers via the respective pipe branches.

Electrolysis leads to a disturbance of the conditions of electric neutrality of aqueous solution at the interface between the ion-exchange membrane and the aqueous solution, and inevitably results in the formation of hardly soluble salts on the ion-exchange membranes. These salts make permeability of membranes difficult. Owing to loss of conductivity the process of desalting stops. To restore the desalting ability of the electrodialyzer it is then necessary to reverse the electrode polarity and reverse the directions of hydraulic flows from the desalting and concentration chambers and thus change the direction of ion migration through the ion-exchange membranes. Electrochemical dissolution of sedimentary salts results in formation of an intermediate solution which is brought out of both chambers of each pair.

Then the first output pipe branches are set shut while the second output pipe branches in the desalting and concentration chambers are set open such that the functions of these chambers interchange their places and the concentrate and the desalted solution are brought out of chambers via the second pipe branches respectively.

When the desalting ability of the electrodialyzer is restored, the working cycle is repeated.

A common disadvantageous feature of prior art devices such as that of the electrodialyzer which has been described herein, consists of low specific productivity caused by the inevitable formation of the sedimentary hardly soluble salts on the ion-exchange membranes and the resulting loss of conductivity necessitating a halt of the process of aqueous electrolyte solution desalting. The need to periodically restore desalting apparatus, caused by the formation of the sedimentary hardly soluble salts on the membranes, requires additional means and measures to eliminate them.

Thus, the common design of the electrodialyzer is complicated due to the units for electrode polarity reversion and for turning hydraulic flow in directions opposite to their working ones. Besides, additional energy expenditures for electrochemical dissolution of these sedimentary salts are necessary.

What is more, due to the need to feed the initial solution into each chamber and the need to form and withdraw intermediate- and end-products from each chamber, the usual design of the electrodialyzer is also complicated by the large number of pipe branches which result in inconvenience in assembly and maintenance and also leads to an increase in the total material required.

Another known electrodialyzer is described in UK Patent 882 432 comprising a succession of interlacing desalting and concentration chambers with cationic and an ionic exchange membranes successively arranged and with an anodic chamber and a cathodic chamber at opposite ends of the electrodialyzer. This apparatus can run a two or three flow process creating conditions for controlling cation transference to the anodic chamber due to replacement of a cation-exchange membrane with an ion exchange membrane.

However, this known apparatus has the disadvantage of attracting deposition of hardly soluble calcium sulphate, calcium carbonate, magnesium and iron hydroxides on the membranes in the desalting chamber and this leads to a decrease in productivity and additional energy consumption.

In UK Patent 750 500 desalination takes place in compartments formed by cation and anion exchange membranes with demineralized water flowing in one direction and concentrate flowing in the opposite direction. The initial water flow into the anodic chamber is controlled. It flows from the anodic chamber to the concentration chamber from which the concentrate is removed from the electrodialyzer.

Again this known apparatus attracts undesirable deposition of hardly soluble salts on the membranes and on the side of the desalting chambers. Not only does this reduce its effectiveness and increase its energy consumption but it is also necessary to regularly halt the process to clean off the deposits thus further reducing productivity.

In WO91/04782 a succession of chambers is described including an anodic chamber into which the initial water solution is fed and in which acid synthesis occurs on the inner side of the anode. The acid produced is fed to a desalting chamber in a hermetically sealed channel and then diffuses through cation-exchange membranes into concentration chambers. A pH of 3 and less is thus possible.

In this known electrodialyzer the acid synthesis proceeds due to water oxidation according to the formula

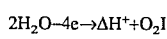

$$2H_2O-4e \rightarrow 4H^+ + O_2\uparrow$$

Thus it can be seen that during acid synthesis, bubbles of gaseous hydrogen form on the anode and cover its surface thus reducing the active surface of the anode and increasing the energy consumption.

These bubbles form gas sacks in the desalting chambers and water flow channels causing increased hydraulic resistance, and reduction of the ionic transference rate through the membranes. Again lower productivity and higher energy consumption results.

Another problem with this known apparatus is the phenomena of concentration polarization at the anode solution interface due to a lower concentration gradient in the diffusing layer because of the low anion rate of diffusion from the solution to the anode reaction surface. This causes undesirably high water decomposition when the flow density is particularly high and again additional energy is consumed and lower productivity results.

In FR-A-1 223 965 an electrodialyzer is described with a succession of chambers, including a concentration chamber, separated by anion and cation-exchange membranes. However problems are also encountered in this apparatus in that deposition of salts on the membranes reduces productivity and increases energy consumption.

It will therefore be seen that known electrodialyzers are unsatisfactory and improvements are desirable in particular because of the deposits of hardly soluble salts on the membranes resulting in increased energy consumption, and also because removal of sediment through acid synthesis at the anode, necessitating a pH of 3 or less, and the further transference to the concentration and desalting chambers requires an extremely high current density on the electrodes resulting in undesirably high energy additional consumption.

The present invention seeks to provide an improved electrodialyzer compared to the known apparatus.

DISCLOSURE OF INVENTION

According to one aspect of the present invention, there is provided an electrodialyzer comprising a container having an input for supplying aqueous solution to be desalinated and an output for carrying substantially desalinated solution out of the container, at least one membrane adapted to provide an anion exchange, at least one membrane adapted to provide a cation-exchange, a flow path from the input to the output across a surface of each of the membranes successively, and a concentration chamber separated from successive portions of the flow path by an anion exchange membrane, and by a cation-exchange membrane, and means being provided for drawing off fluid accumulating in the concentration chamber wherein the electrodialyzer comprises an anode arranged at the beginning of the flow path in abutment with the container and with a cation-exchange membrane.

Preferably, the electrodiatyzer further comprises means for acidifying the aqueous solution near the beginning of the flow path, and means for neutralizing it towards the end of the flow path and according to a preferred embodiment comprises an opening in the anode at the beginning of the flow path for drawing off gaseous products.

According to a preferred embodiment there is provided an electrodialyzer comprising:

a plurality of parallel chambers arranged between an input for supplying aqueous solution to be desalinated and an output for substantially desalinated water;

the chambers including, in succession in the flow path, an anodic chamber in which is located the input, an anode and a cation-exchange membrane;

a desalting chamber; and a cathodic chamber in which is located the output, a cathode, and one surface of a second cation-exchange membrane; wherein a hermetic channel provides fluid communication between the anodic chamber and the desalting chamber and wherein fluid in the desalting chamber communicates with fluid in the cathodic chamber via a hole in the second cation-exchange membrane, and wherein the anode is in abutment with the first cation-exchange membrane, and a concentration chamber is provided which is delimited from the anodic chamber by an ion-exchange membrane. Preferably means are provided for applying an electrical bias between the anode and the cathode such that the aqueous solution is exposed to the electrical bias substantially throughout the flow path.

According to a second aspect of the present invention, there is provided a process for desalinating an aqueous solution comprising providing a housing having a succession of chambers including a concentration chamber bounded by each of a membrane adapted to provide anion exchange and by a membrane adapted to provide cation-exchange, supplying the aqueous solution to the succession of chambers in such a way that it flows in a flow path from an input to an output successively across the surfaces of each of the membranes, applying an electrical bias to the solution to cause the ions to form and to migrate from the flow path into the concentration chamber which is separated from the flow path by the anion exchange membrane and the cation-exchange membrane and drawing off fluid accumulating in the concentration chamber, and drawing off gaseous products from the flow path.

Preferably, the process further comprises causing the aqueous solution to be acidified at the beginning of the flow path and to be neutralized at the end of the flow path.

According to a third aspect of the present invention, there is provided an electrodialyzer comprising a housing with pipe branches for initial aqueous solution input and desalted water and concentrate output, a line of parallel chambers inside the housing being limited with the walls formed by the alternating with each other according to the technological process cation-exchange and anion-exchange membranes; an anodic chamber at one end wall of the housing, then at least one pair of concentration and desalting chambers, then a cathodic chamber at another end wall of the housing, said anodic chamber with the anode in it being formed by the internal surface of the end wall of the housing and by the cation-exchange membrane, the other side of which limits the adjacent concentration chamber while the opposite side of said membrane limits the desalting chamber, the opposite side of which is formed by the cation-exchange membrane, the opposite side of said membrane and the second end wall of the housing limit the cathodic chamber with a cathode disposed in it, said cathode as well as said anode being connected with the source of direct electric current, improvement which consists in the fact that the pipe branch for initial aqueous solution input is disposed in the anodic chamber, the pipe branch for desalted water output is disposed in the cathodic chamber while the pipe branch for concentrate output is disposed in hydraulically isolated concentration chambers of each pair of chambers, the internal volume of the anodic chamber successively communicates with the desalting chamber via hermetic channels provided in the concentration chambers of the pairs, while the last chamber in the line communicates with the cathodic chamber via the opening provided in the cation-exchange membrane, and what is more, the anode in the chamber is fixed to the internal end wall of the housing and has the opening which is aligned with the opening in the end wall of the housing while the additional cation-exchange membrane is pressed to the surface of the anode from the internal side of the anode chamber.

One advantage of the present invention lies in the fact that its structure provides the necessary conditions for a continuous technological cycle of desalting of the initial electrolyte aqueous solution and thus increasing the apparatus productive capacity with a reduction of energy consumption.

The structure of the anodic chamber, i.e. with the anode disposed at the end of the housing wall and with direct contact between the anode surface and a cation-exchange membrane from the internal side of the chamber, this membrane being additionally provided in the anodic chamber, causes initiation of protons $H^+$ activation. At the boundary of contact of the anode surface and the damp cation-exchange membrane electrolysis takes place resulting in the formation of synthetic acid from water, which diffuses through the cation-exchange membrane into the anodic chamber and acidifies the initial aqueous solution fed into the chamber, thus providing the best desalting conditions.

The acid synthesis initiation process is reached by introduction of 10% solid acid into the diffusion layer provided by the cation-exchange membrane, for example on the basis of a fluorine-carbon polymer of sulphonic acid:

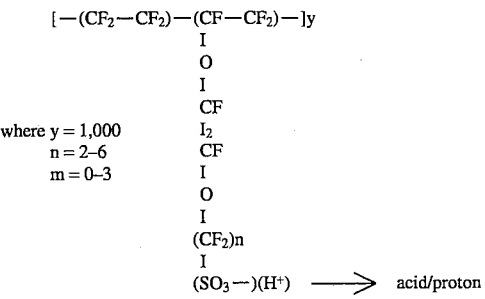

This matrix intensifies the synthesis process and protein transference to the anodic space of the chamber thus decreasing the synthesis energy consumption.

Aligned openings in the anode and in the end wall of the housing are preferably provided to form a channel via which gaseous products of decomposition are taken out of the chamber during electrolysis and ensures good conditions for electrochemical synthesis in the anodic chamber and increasing productivity.

Due to input of initial aqueous solution through the anodic chamber only and output of the final product from the cathodic chamber only as well as due to hydraulic isolation of the concentration chambers ensuring the flow of anolyte through these chambers, a continuous technological cycle takes place in the electrodialyzer and any hydraulic losses are substantially eliminated.

Also the structure of the electrodialyzer of the invention provides technological conditions which prevent the formation and deposition of hardly soluble sediments on the ion-exchange membranes with minimum energy consumption caused by hydraulic losses, and thus excluding the necessity of periodically stopping the apparatus for electrochemical dissolution of sediments and hence increasing the productive capacity of the apparatus. The invention enables the permanent maintenance of a pH concentration equal to 3 and less while the current density can be kept low ensuring conditions of electroneutrality of the water flowing in by membranes and reducing the salt deposits. Productivity is thus enhanced and demineralization is continuous with minimum power consumption.

At the same time the apparatus of the invention is simplified: instead of a minimum of ten input/output pipe branches in some of the previous art apparatus, there can be a minimum of three such branches in the apparatus according to the invention (attached to one pair of chambers between the electrode chambers).

DETAILED DESCRIPTION

Figure 1:
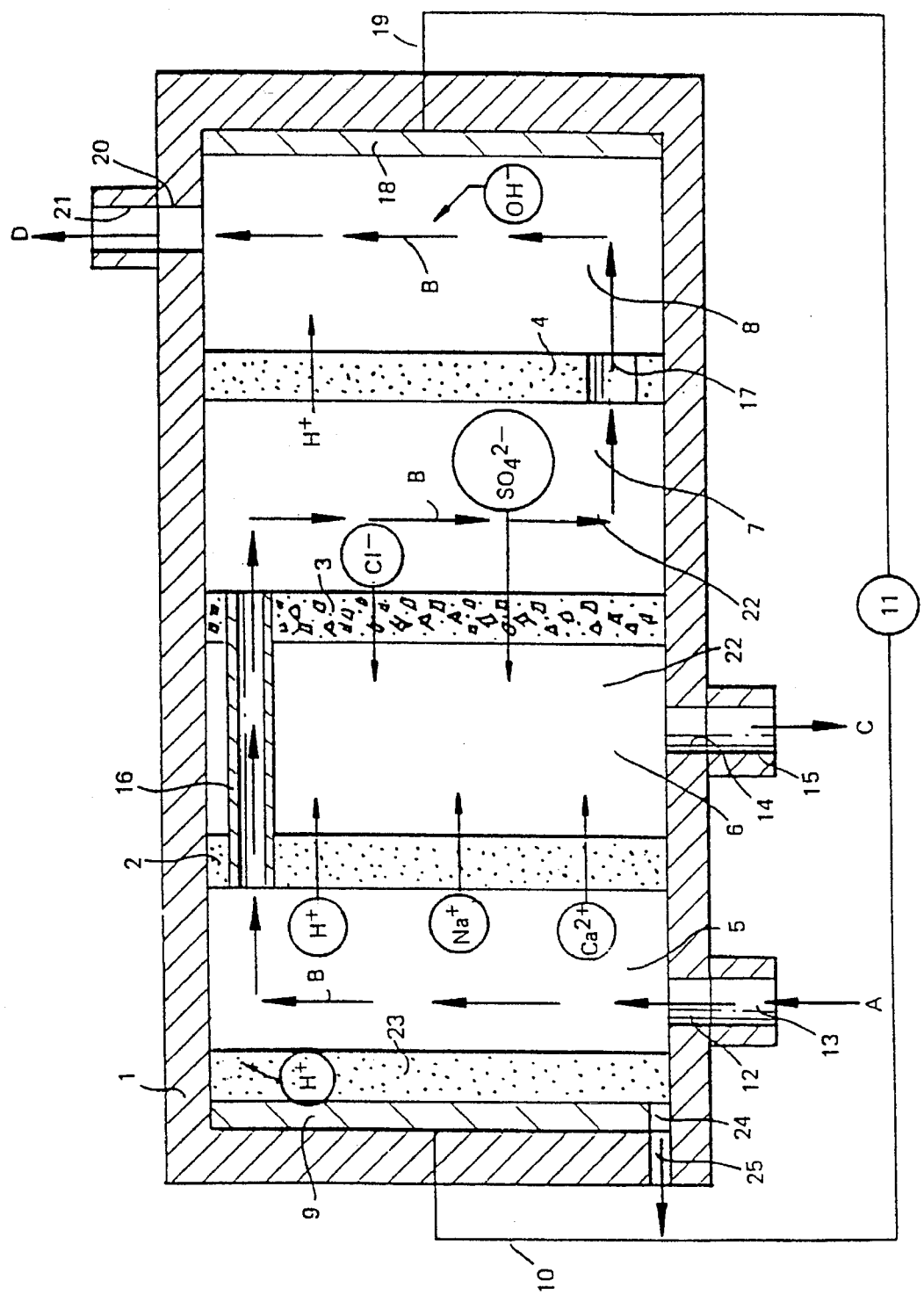
FIG. 1 is a schematic view of an electrodialyzer including one concentration chamber and one desalting chamber in longitudinal section according to the invention.

The present electrodialyzer comprises a hermetic housing 1 (FIG. 1) inside of which are mounted in parallel, alternately a cation-exchange membrane 2, an anion-exchange membrane 3, and a cation-exchange membrane 4, which divide the cavity of the housing 1 into parallel extending anodic chamber 5, concentration chamber 6, desalting chamber 7 and cathodic chamber 8. The electrode chambers 5 and 8 are situated at the end walls of the housing 1. The anodic chamber 5 is formed by the inner surface of the end and side walls of the housing 1 and by one side of the cation-exchange membrane 2. On the inner surface of the end wall of the housing 1 there is fixed an electrode which is the anode 9 provided with the lead 10 which extends outwardly from the housing 1 and is connected to a positive terminal of the power supply 11 of direct current.

The bottom wall of the anodic chamber 5 has an opening 12 with a pipe connection 13 for input of initial aqueous electrolyte solution. The concentration chamber 6 is formed by the inner surface of the side walls of the housing 1, other side of the cation-exchange membrane 2 and one side of the anion-exchange membrane 3. The bottom wall of the chamber 6 has an opening 14 with a pipe connection 15 for output of the concentrate.

In the upper parts of the cation-exchange membrane 2 and anion-exchange membrane 3 there is a pipe 16. The pipe 16 represents a channel connecting the anode chamber 5 and the desalting chamber 7 and serves for anolyte flow. The desalting chamber 7 is formed by the inner surface of side wall of the housing 1, other side of the anion-exchange membrane 3 and one side of the cation-exchange membrane 4. In the lower part of the membrane 4 is located an opening 17 for communication of the desalting chamber 7 with the cathodic chamber 8. The cathodic chamber 8 is formed by another side of the cation-exchange membrane 4, the inner surface of the side walls of the housing 1 and its end wall on which the electrode is fixed, being itself a cathode 18. The lead 19 of the cathode 18 extends outwardly and is connected to a negative terminal of the power supply 11. In the cathodic chamber an opening 20 is provided into which a pipe connection 21 is inserted for output of the desalted solution. The concentration chamber 6 and the desairing chamber 7 make one pair (or block) 22 of chambers. Depending on the demands of initial aqueous solution filtration there may be several pairs (blocks) of chambers in the electrodialyzer.

To intensify the process, the additional cation-exchange membrane 23 is applied pressed to the inner surface of anode 9. In the anode 9 an opening 24 is provided which is aligned with the opening 25 in the end wall of the housing. The openings 24 and 25 form a channel for withdrawal of the gaseous products of the acid synthesis from the anodic chamber.

Aqueous solution is fed in the direction marked with the arrow A. Arrows B designate the directions of the aqueous electrolyte solution flow inside the housing 1 of the electrodialyzer. Concentrate and desalted aqueous solution/ final product are withdrawn in the directions designated by arrows C and D, respectively.

In FIG. 1 are also designated:

$H^+$ —proton $Na^+$ —sodium cation $Ca^{2+}$ —calcium cation $Cl^-$ —chlorine anion $SO_4^{2-}$ —sulphate anion The arrow with the circle at its end in which charge of the ion is indicated shows the direction of ion movement.

Figure 2:
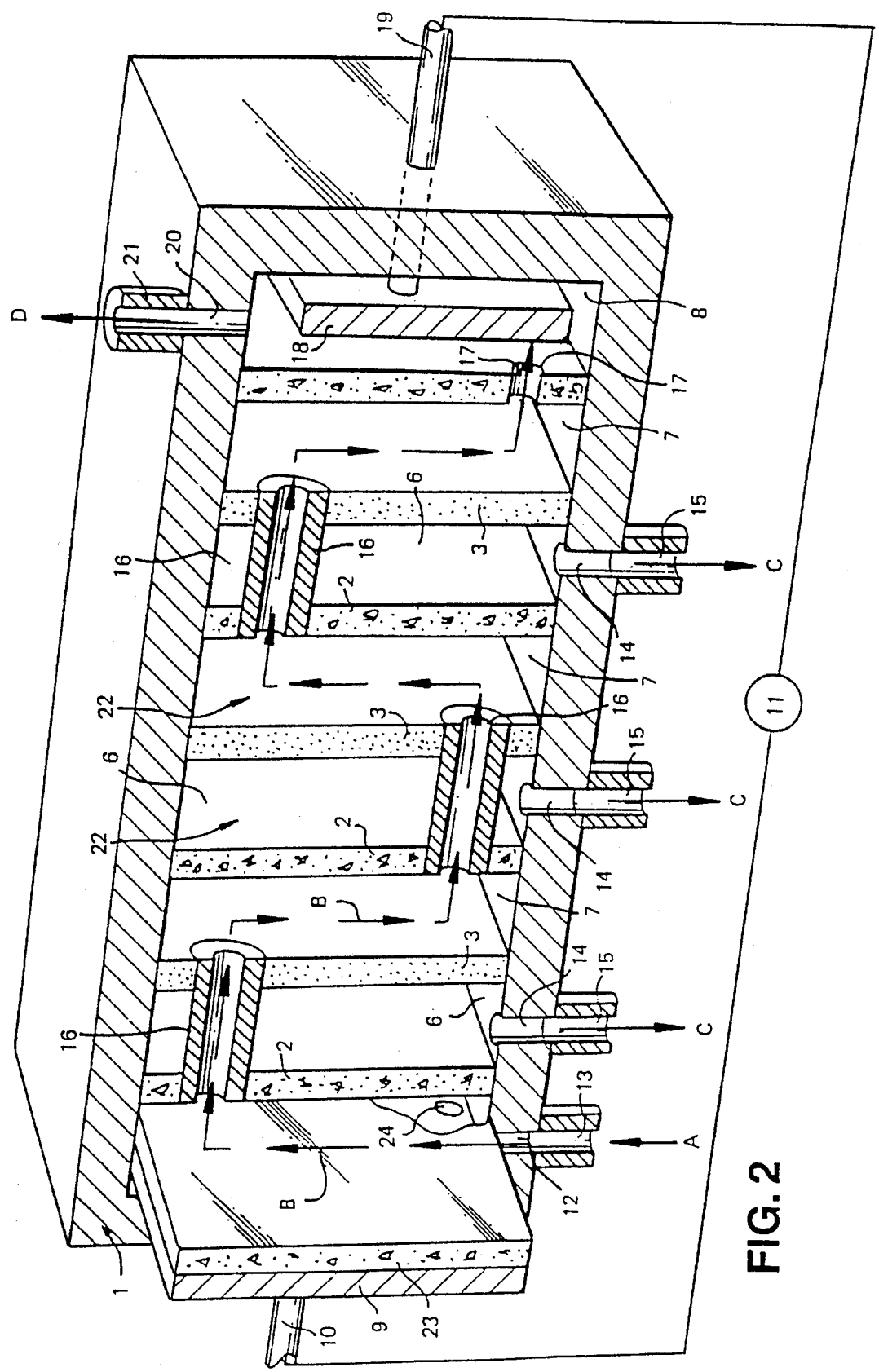
FIG. 2 is a general view of an electrodialyzer according to the invention with three pairs of chambers in longitudinal section.

FIG. 2 shows the electrodialyzer having three pairs 22 of concentration/desalting chambers 6, 7.

In the remaining aspect, the structure of the electrodialyzer shown in FIG. 2 is similar to that shown in FIG. 1. In the first pair 22 of chambers the pipe 16 is provided in the upper part of the chamber 6, in the second pair 22 of chambers the pipe 16 is provided in the lower part of the chamber 6 and in the third pair 22 of chambers the pipe 16 is provided in the upper part of the chamber 6. The above mentioned arrangement of the pipes 16 ensures continuous and uniform flow of aqueous solution through all chambers 5, 6, 7, 8.

The electrodialyzer operates as follows.

Desalting of aqueous solution takes place in the process of continuous filtration when passing of aqueous solution through the anodic chamber 5 (FIGS. 1, 2), the desalting chamber 7 and the cathodic chamber 8. Initial aqueous solution, salt water for instance, is fed to the anodic chamber 5 through the input pipe connection 13. At the same time, electric current is supplied from the power supply 11 to the anode 9 and to the cathode 18 with density which provides pH=2 in the concentration chamber 6. This pH value prevents precipitating of hardly soluble salts onto membranes 2, 3.

Under the action of electric current on the boundary of contact of the anode 9 surface with the damp cation-exchange membrane 23 in the anodic cheer 5, the electrolysis takes place with formation of the synthetic acid (shown in FIG. 1 as protons $H^+$ which diffuses through the cation-exchange membrane 23 into the anodic chamber 5 and acidifies the initial aqueous solution fed via a pipe connection 13, while gaseous product of decomposition is taken off through the openings 24 and 25 in the housing 1 outwardly to a gas-holder.

Then acid aqueous solution is fed through the pipe 16 to the desalting chamber 7 where, under the action of direct electric current, salt ions $Cl^-$, $SO_4^{2-}$ from aqueous solution diffuse through the membrane 3 to the concentration chamber 6, while ions $Na^+$ and $Ca^{2+}$ diffuse through the membrane 2 from the anodic chamber 5 to the concentration chamber 6.

Acid diffuses through the membrane 4 from the desalting chamber 7 to the cathodic chamber 8. Thus desairing of aqueous solution with the concentrate formation takes place in the chamber 6, from which it is withdrawn via a pipe connection 15 in the direction designated by arrow C. Acid aqueous solution is fed through the opening 17 in the membrane 4 to the cathodic chamber where, under the action of electric current, the electrolysis of aqueous solution takes place with formation of hydroxyl ions $OH^-$ in such a quantity which is equivalent for neutralization of acid fed to the cathodic cheer 8. Then the desalted aqueous solution is withdrawn through the pipe connection 21 from the cathodic chamber 8.

FIG. 2 shows an electrodialyzer having three pairs 22 of cheers 6 and 7 between the electrode cheers 5 and 8 and working in the same way.

The initial solution of salt water, for instance, is fed through the input pipe connection 13 of the anodic chamber.

Anions $Cl^-$, $SO_4^{2-}$ diffuse through the anion-exchange membrane 3 from the desalting chamber 7 of the second pair 22 of chambers to the concentration chamber 6 of the same pair 22. Thus desalting of aqueous solution takes place in the desalting chamber 7 of all pairs 22 and the concentrate is formed in all concentrations chambers 6. The concentrate is removed from all concentrations chambers 6 through the output pipes 15. Desalted aqueous solution is removed from the cathodic chamber 8 through the pipe 21.

Thus, the structure of the present electrodialyzer provides the conditions for continuous technological cycle of aqueous solution desalting with maximum possibility of electrochemical interaction of aqueous solution with the structural elements of the apparatus in its working chambers, thus increasing the apparatus productive capacity with simultaneous reduction of total energy consumption.

The invention is applicable to the purification of aqueous solutions with excessive soluble salt impurities to achieve a required final concentration of salts. Also, the invention may be widely applied for the purification of water in the chemical, power, radioelectronic and medical industries as well as in the municipal water supply systems.

We claim:

1. An electrodialyzer comprising:

a container having an input for supplying aqueous solution to be desalinated and an output for carrying substantially desalinated solution out of the container, at least one membrane adapted to provide an anion exchange, at least one membrane adapted to provide a cation-exchange, a flow path from the input to the output across a surface of each of the membranes successively, and a concentration chamber separated from successive portions of the flow path by an anion exchange membrane, and by a cation-exchange membrane, and means for drawing off fluid accumulating in the concentration chamber, and an anode arranged at the beginning of the flow path in abutment with the container and with a cation-exchange membrane.

2. An electrodialyzer according to claim 1 wherein the membranes are arranged so that the flow path is continuous and non-linear.

3. An electrodialyzer comprising:

a plurality of parallel chambers arranged between an input for supplying aqueous solution to be desalinated and an output for substantially desalinated water;

the chambers including, in succession in the flow path, an anodic chamber in which is located the input, an anode and a cation-exchange membrane;

a desalting chamber; and a cathodic chamber in which is located the output, a cathode, and one surface of a second cation-exchange membrane; wherein a hermetic channel provides fluid communication between the anodic chamber and the desalting chamber and wherein fluid in the desalting chamber communicates with fluid in the cathodic chamber via a hole in the second cation-exchange membrane, and wherein the anode is in abutment with the first cation-exchange membrane, and a concentration chamber is provided which is delimited from the anodic chamber by an ion-exchange membrane.

4. An electrodialyzer according to claim 3 wherein an opening is provided in the anode adapted to enable withdrawal of gaseous products from the anodic chamber.

5. An electrodialyzer according to claim 4 comprising means for applying an electrical bias between the anode and the cathode such that the aqueous solution is exposed to the electrical bias substantially throughout the flow path.

* * * * *